| United States Patent [19] | [11] Patent Number: 4,755,580 |
| Saunders et al. | [45] Date of Patent: Jul. 5, 1988 |

[54] EPOXY COATING COMPOSITIONS CONTAINING A DUAL MIXTURE OF A BORON TRIHALIDE COMPLEX AND AN IRRADIATED CHARGE TRANSFER COMPLEX AS CURING AGENT

[75] Inventors: Howard E. Saunders, Murrysville; Rajender K. Sadhir, Plum Boro, both of Pa.; Richard D. Buckley, Watkinsville, Ga.

[73] Assignee: Westinghouse Electric Corp., Pittsburgh, Pa.

[21] Appl. No.: 926,304

[22] Filed: Nov. 3, 1986

[51] Int. Cl.[4] .................. C08G 59/72; C08G 59/42
[52] U.S. Cl. ........................... 528/91; 528/90; 528/112; 528/408; 528/365; 525/507
[58] Field of Search ............... 528/88, 90, 91, 112, 528/365, 408; 525/507

[56] References Cited

U.S. PATENT DOCUMENTS

| 3,793,247 | 2/1974 | Fleming et al. | 528/91 X |
| 3,960,684 | 6/1976 | Feinberg | 528/91 X |
| 4,398,013 | 8/1983 | Johnson | 528/91 X |

OTHER PUBLICATIONS

Chemical Abstracts 66, 29157e (1967).

*Primary Examiner*—Earl Nielsen
*Attorney, Agent, or Firm*—Daniel P. Cillo

[57] ABSTRACT

A coated article is made by: (1) admixing an epoxy resin, with a dual curing agent admixture of (a) an irradiated mixture of carboxylic acid anhydride and carbon containing cyclic compound and (b) a boron trihalide complex selected from at least one of boron trihalide:amine and boron trihalide:ether, (2) applying the mixed resin and concentrated dual curing agent to the surface of an article, and (3) curing the applied resin and curing agent.

8 Claims, 1 Drawing Sheet

EPOXY COATING COMPOSITIONS CONTAINING A DUAL MIXTURE OF A BORON TRIHALIDE COMPLEX AND AN IRRADIATED CHARGE TRANSFER COMPLEX AS CURING AGENT

BACKGROUND OF THE INVENTION

Carboxylic acid anhydrides, Lewis Acids, and boron trifluoride:amine complexes are curing agents that have been found to be useful with epoxy resins for insulating applications, as described by Lee and Neville in the *Handbook of Epoxy Resins*, McGraw Hill, 1967, pages 11-1 to 11-8 and 12-1 to 12-27. Usually, the addition of an accelerator is required to give reasonable gel times at elevated temperatures, but at room temperature, even with high concentrations of accelerators, very slow gel times are experienced. Considerable effort has been devoted in recent years to developing improved room temperature curing agents for epoxy-anhydride resins.

Ecke et al., in U.S. Pat. No. 3,114,752, taught the reaction of tetrahydrofuran with maleic acid in the presence of a free radical initiator to produce monomeric 1:1 adducts. Free radical initiators were taught to include ultraviolet light and various persulfates, peroxides and nitrides. The compounds formed were bonded adducts rather than disassociated species such as free radicals, and were taught as useful plasticizers and curing agents for epoxy resins. Smith et al., in U.S. Pat. No. 4,273,914, discovered a low temperature, fast curing epoxy insulating composition, which consisted of an epoxy resin and a carboxylic acid anhydride complex. The anhydride complex was made by the low temperature reaction of a selected Lewis Acid catalyst, such as antimony pentrachloride, titanium tetrachloride, boron trifluoride, tin tetrachloride, or triphenyl tin chloride, with a carboxylic acid anhydride. There, the catalyst and anhydride were simply pre-reacted at a reacting mass temperature of from 10° C. to about 45° C. The complex allowed substantially complete cure of the epoxy resin at 25° C. in about 48 hours.

Von Brachel et al., in U.S. Pat. No. 3,499,007, utilized a peroxide initiated, non-irradiated, free-radical chain reaction of maleic anhydride and straight chain polyalkylene ethers, at from about 80° C. to 160° C., to provide addition products, noting that the literature showed successful reaction of maleic anhydride with tetrahydrofuran, but not dioxane, in the presence of radical initiators. These addition products were found useful as raw materials for lacquers, and as surface active anhydride components in the production of polyesters. These addition products were usually reacted at from 100° C. to about 130° C. with epoxies and the like.

Charge-transfer systems have recently been shown capable of polymerizing monomer and epoxy resins. Williamson et al., *J. Polm. Sci., Polm. Chem. Ed.*, Vol. 20, pp. 1875-1984, 1982, "Laser-Initiated Polymerization of Charge-Transfer Monomer Systems" described polymer formation after laser exposure in three successful systems: 9-vinylanthracene/diethylfumarate; 2-vinylnaphthalene/fumaronitrile, in methylene chloride solvent; and 2-vinylnaphthalene/fumaronitrile, in sulfolane solvent. Another article, "Laser Initiated Polymerization of Charge Transfer Monomer Systems: Copolymerization of Maleic Anhydride with Styrene, Vinyltoluene and t-Butylstyrene", by R. K. Sadhir et al., *Polym. Prepr. Am. Chem. Soc. Div. Polym. Chem.*, Vol. 23, No. 1, pp. 291-292, March 1982, describes vinyl-maleic anhydride systems and a theoretical discussion of 3,600 Angstrom Unit laser irradiation of such systems to form charge transfer systems.

Later articles, "Laser-initiated Copolymerization of Maleic Anhydride with Styrene, Vinyltoluene, and t-Butylstyrene", by R. K. Sadhir et al., *J. Polym. Sci. Polym. Chem. Ed.*, Vol. 21, No. 5, pp. 1315-1329, May 1983, and "Laser-Initiated Polymerization of Epoxies in the Presence of Maleic Anhydride", by R. K. Sadhir et al., *J. Polym. Sci. Polym. Chem. Ed.*, Vol. 23, pp. 411-427, 1985, give a more detailed description of laser-initiated polymerization of styrene, vinyltoluene and t-butystyrene in the presence of maleic anhydride, and laser-initiated polymerization of cyclohexene oxide in the presence of maleic anhydride, respectively.

Sadhir et al., in U.S. patent application Ser. No. 739,242, filed on May 30, 1985, utilized a concentrated, highly reactive, irradiated catalytic complex as a low temperature curing agent for organic resins. The complex was produced by U.V. or laser irradiating and then cold concentrating a mixture of carboxylic acid anhydride and at least one of a cyclic compound selected from tetrahydrofuran, dioxane, trioxane, and sulfolane, with no use of catalysts or initiators. These concentrated catalytic complexes were described as sole room temperature catalysts with epoxy resins and vinyl monomers, to provide impregnating, potting, or protective encapsulating resins for motor coils, or coil connection insulators for high voltage rotating apparatus. Examples showed a quick room temperature cure with cycloaliphatic epoxy resins. It has been found, however, that these complexes provide a slower room temperature cure with bisphenol A epoxy resins than with cycloaliphatic epoxy resins.

Since the bisphenol A epoxy is the most commonly used and inexpensive type of epoxy resin, it is highly desirable to find a fast acting catalyst for them which is useful at room temperature, and to provide fast, room temperature curable bisphenol A epoxy coating compositions. It would also be highly desirable to be able to fast cure cycloaliphatic epoxy resins at times below 3 minutes at room temperature, for fast production line, thin coating of a variety of articles.

SUMMARY OF THE INVENTION

The above problems have been solved and the above needs met by admixing an epoxy resin with a dual curing agent consisting essentially of: (1) a charge transfer complex produced by mixing and irradiating a combination of: (a) a carboxylic acid anhydride, selected from halide or short chain alkyl substituted maleic anhydride, and preferably citraconic anhydride or maleic anhydride, and their mixtures, and (b) a carbon containing cyclic compound containing an electron deficient element, such as sulfur or preferably oxygen and their mixtures, selected from the group consisting of tetrahydrofuran, dioxane, trioxane, and sulfolane, and their mixtures, and (2) a boron trihalide complex, such as a boron trihalide:amine complex, a boron trihalide:ether complex or mixtures thereof, where halide is preferably fluorine or chlorine. Preferably, the irradiated mixture of carboxylic acid anhydride and carbon containing cyclic compound is concentrated before or after mixing with the boron trihalide complex.

The preferred weight ratio of carboxylic acid anhydride:carbon containing cyclic compound in the catalytic complex is from about 1:0.8 to 2. In the reaction to form the unconcentrated charge transfer complex, no free radical initiators are used, and the temperature is preferably kept below about 45° C. The weight ratio of charge transfer complex:boron trihalide complex can generally be from about 25 to 200:1, but when the resin to be cured is a bisphenol A epoxy, the ratio drops to about 25 to 40:1.

The charge transfer complex can be concentrated without the use of heat, in, for example, a vacuum chamber or other vacuum means, to from about 55% to about 90% of its original weight, to remove any plasticizing compounds. This concentration is preferably done after mixing the unconcentrated charge transfer complex and the boron trihalide complex. If the charge transfer complex is concentrated before mixing with the boron trihalide complex, solubility problems with the boron trihalide complex in the concentrated charge transfer complex are possible. The highly reactive dual mixture of charge transfer complex and boron trihalide complex, is herein defined as the "dual curing agent" of this invention. When it is cold concentrated and added in a weight ratio of epoxy resin:dual curing agent of from about 1:0.2 to 1.5, it will effect substantially complete cure at 25° C. to 2 mil thick coatings of bisphenol A epoxy resins in about 10 minutes. No additional curing agents are needed.

The irradiation to form the unconcentrated charge transfer complex can be, for example, from a laser or a U.V. lamp, and contains radiation within the wavelength range of from about 130 Angstrom units to about 7,000 Angstrom units. The irradiation is effective only when both the selected carboxylic acid anhydride and the selected carbon containing cyclic compound are mixed together, the irradiation of the mixed product solution producing an active species which is responsible for helping to initiate resin polymerization at room temperature. The resins incorporating these dual curing agents can be used to encapsulate electrical articles, to act as an insulating adhesive, and particularly, to act as fast, room temperature curable, surface coating paints of 0.02 inch thickness or less, for steel, other metals, wood, and plastics.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
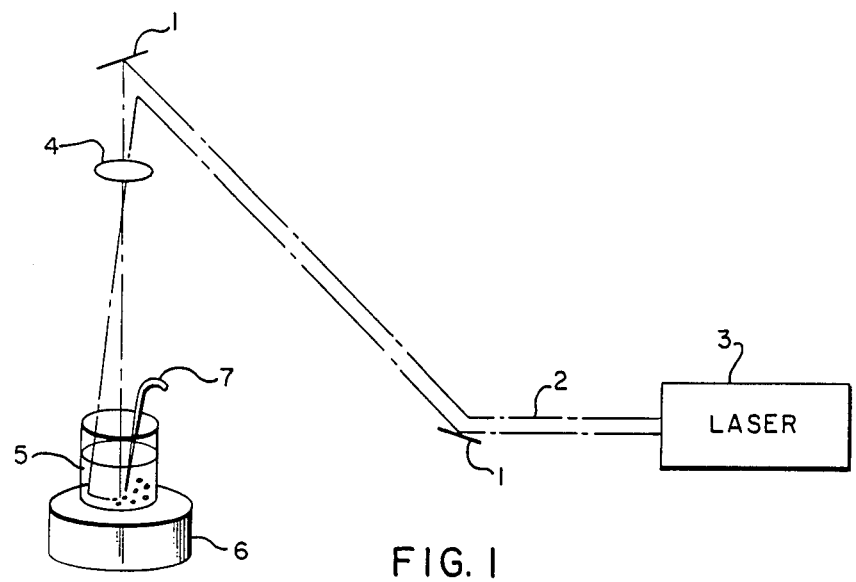
FIG. 1 shows one type of apparatus that can be used to produce the cyclic catalytic complexes used in this invention.

It has been found that selected carbon containing cyclic compounds, containing an electron deficient element, can effectively interact and complex with selected carboxylic acid anhydrides, through irradiation containing radiation within the radiation wavelength range of from about 130 Angstrom units to about 7,000 Angstrom units, preferably in the range, of from about 2,000 Angstrom units to about 7,000 Angstrom units, and most preferably from about 2,000 Angstrom units to about 3,900 Angstrom units. The irradiation need not be wide band, but can be any portion within the band. Laser irradiation, for example with an Argon laser at about 3,600 Angstrom units, is a very concentrated and energy efficient substitute for common ultraviolet (U.V.) lamp sources, and allows the reaction to proceed at about 25° C. without the need for cooling.

When a laser is used, 5 minutes to 60 minutes irradiation will provide an effective amount of reactive species, which when mixed with a boron trihalide complex can be used to cure epoxy resins, and particularly bisphenol A epoxy organic resins. When a 250 watt to 500 watt U.V. lamp is used, 15 minutes to 90 minutes will provide an effective amount of reactive species, which when mixed with a boron trihalide complex can be used to quick cure epoxy resins, and in particular, bisphenol A epoxy resins. Preferably, especially if bisphenol A epoxies are to be used, the charge transfer complex will be further concentrated. In the case of the U.V. lamp, the reacting mixture is preferably surrounded by a refrigeration means, so that the heat of the U.V. lamp does not cause undue evaporation of the reactants before the reaction is completed. In all cases, the temperature should be kept below about 45° C., to prevent evaporation of reactants, for example, maleic anhydride has a sublimation temperature of about 52° C. and tetrahydrofuran has a boiling point of about 66° C.

The useful carbon containing cyclic compounds for the cyclic charge transfer complex component of the dual curing agent of this invention contain one or more sulfur and/or oxygen, preferably oxygen, electron deficient elements or components, where the electron deficient element or component need not be present in the ring structure. Particularly useful compounds of this type include sulfolane, trioxane, and preferably dioxane (1,4-dioxane) and tetrahydrofuran, whose respective chemical structures are shown below:

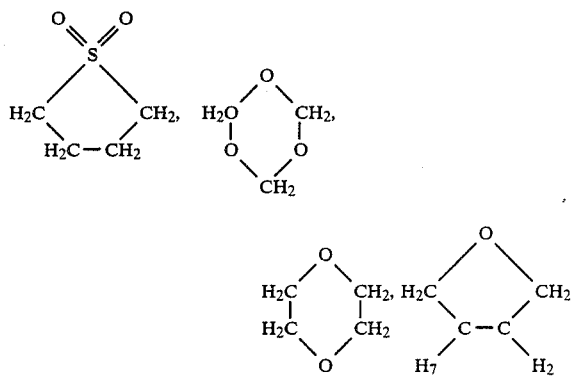

Useful carboxylic acid anhydrides for these complexes include a class of carboxylic acid anhydrides having the chemical formula:

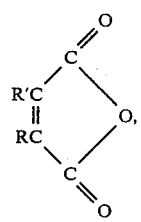

where R and R' = H, CH$_3$, C$_2$H$_5$, Cl, Br or I, for example, R' can = Cl and R can = CH$_3$.

Use of a higher alkyl than $C_2H_5$ as R or R' will slow the irradiation reaction with the carbon containing cyclic compound. The most preferred carboxylic acid anhydrides are those where R=H and R'=$CH_3$, and where R and R'=H, i.e., citraconic anhydride, and preferably maleic anhydride, respectively:

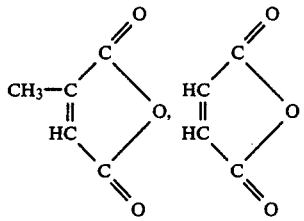

Other carboxylic acid anhydrides, such as hexahydrophthalic anhydride, succinic anhydride, and dodecenyl succinic anhydride, are not effective to provide catalytic reactive species. The double bond opposite the central, single bonded oxygen, appears to be of critical importance in providing catalytic reactive species with the abovedescribed carbon containing cyclic compounds during irradiation. The carbon containing cyclic compounds act as a solvent for the selected acid anhydrides which are usually in solid form. The preferred weight range of (selected carboxylic acid anhydride):(selected carbon containing cyclic compound) is from about (1):(0.8 to 2). Less than 0.8 part/1 part acid anhydride, a solution will not result. Over 2 parts/1 part acid anhydride, the complex may not form.

Usually, the selected acid anhydride is added to the selected liquid carbon containing cyclic compound, acting as solvent, and mixed, at about 25° C. to 30° C., until a solution results. At this point there is no interaction between the two ingredients other than solution formation, i.e., the product of the mixture contains no complexes or reactive species. Then a source of irradiation, such as a bank of U.V. lamps or, for example, an Argon ion laser beam, which provides concentrated radiation and fast interaction, is directed into the solution. FIG. 1 of the Drawings, shows the use of a coherent CR-18 Argon ion laser to produce useful complexes for curing resins. In FIG. 1, mirrors 1 reflect laser beam 2, from laser source 3, through convex lens 4 into monomer solution 5, attached to magnetic stirrer means 6, and having optional nitrogen bubbler means 7.

Upon irradiation of the solution, preferably with radiation containing the wavelength range of from about 2,000 Angstrom units to about 5,200 Angstrom units, and most preferably within the range of from about 2,000 Angstrom units to about 3,900 Angstrom units, a charge transfer complex forms. Although applicants are not to be held to any particular theory, using the interaction between maleic anhydride and dioxane as an example, the possible reactions that, it is thought, might occur include:

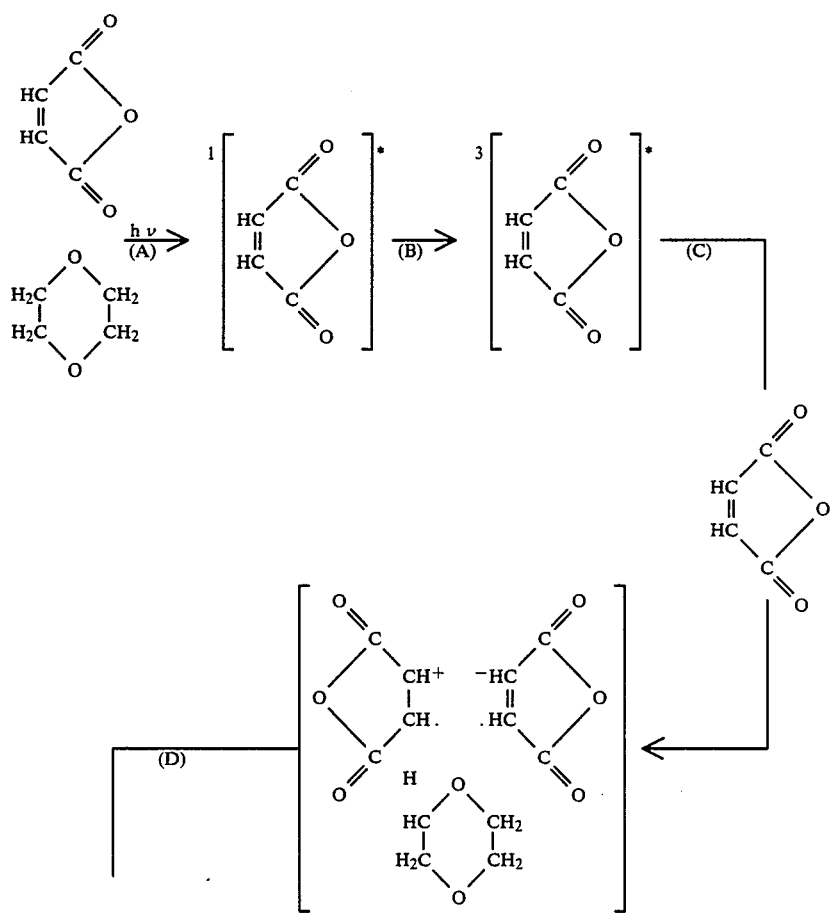

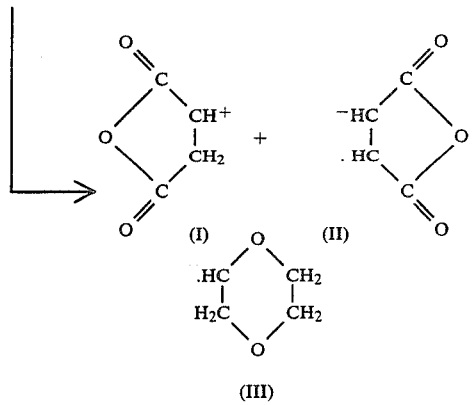

(I)  (II)  (III)

As shown in the previously described reactions, it is believed that argon ion laser action on the product solution and mixture of maleic anhydride and dioxane in step (A) produces a singlet excited species which goes to triplet excited state via step (B). The triplet excimer thus produced reacts with another maleic anhydride unit in the ground state (step C) and produces the reactive charge transfer complex (after step C). This charge transfer complex then abstracts a hydrogen atom from dioxane. This results in a color change between step (C) and step (D) to provide catalytic complexes consisting essentially of reactive species such as cation (I), radical anion (II) and a free radical (III) containing only an electron as a reactive component; which are capable of initiating cationic polymerization in epoxies. In addition to the reactive species shown, it has now been found that a substantial amount, i.e., from about 20% to about 50% of carbon containing cyclic compound added, i.e., such as dioxane, remains unreacted. No deliberate heating is used, care being taken to react only up to about 45° C., with no catalysts, or initiators being present, the reaction proceeding solely due to irradiation effects.

The unreacted, carbon containing cyclic compound remaining after charge transfer complex production, be it dioxane, sulfolane or tetrahydrofuran, has been found to provide a plasticizing effect on epoxy resins, slowing resin cure at 25° C. Continued irradiation has not been found to reduce substantially the plasticizing effect of the unconcentrated charge transfer complex. Heating the charge transfer complex in an attempt to reduce the amount of unreacted, carbon containing cyclic compound causes decomposition of the already formed complex. A means to cold concentrate the charge transfer complex, such as passing a stream of nitrogen gas over the catalytic complex at 25° C., or preferably using a vacuum chamber at 25° C., has been found useful to remove substantially all of the unreacted, carbon containing cyclic compound and reduce substantially the plasticizing effect of the complex. It is also speculated that the concentration may open up some rings of the carbon containing cyclic compounds, providing additional reactive species.

At this point the boron trihalide complex is added to the charge transfer complex. The boron trihalide complex is selected from the group of boron:trihalide amine complex and boron:trihalide ether complex having the respective chemical structures:

$$R_1\!-\!\!\underset{R_2}{\overset{H}{N}}\!\!:\!B\!\!\underset{X}{\overset{X}{-}}\!X, \text{ and } R_1\!-\!\!\underset{R_2}{\overset{}{O}}\!\!:\!B\!\!\underset{X}{\overset{X}{-}}\!X,$$

and their mixtures, where halide X is selected from the group consisting of F, Cl, Br and I, with F and Cl preferred. $R_1$ is selected from H, alkyl having from 1 to 6 carbon atoms, aryl, saturated carboxcyclic, and their combinations; and $R_2$ is selected from alkyl having from 1 to 6 carbon atoms, aryl, saturated carbocyclic, and their combinations. Boron trihalide:amine complexes are the preferred of the two additives. Preferred boron trihalide amines would include: boron trifluoride:aliphatic amine complex, boron trifluoride:aromatic amine complex, boron trifluoride amine complex where the amine contains both aliphatic and aromatic groups, boron trichloride:aliphatic amine complex, boron trichloride:aromatic amine complex, and boron trichloride amine complex where the amine contains both aliphatic and aromatic groups. Applicants are not at this point sure why the combination effect of charge transfer complex plus boron trihalide complex produces dramatic differences in cure times.

It is speculated that there may be some interactivity between the two. It is also speculated that in the presence of an epoxy group

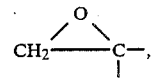

hydrogen will split off the amine or ether to form radical anions, for example $R_1R_2N\!:\!BF_3^-\!+\!H^+$ or $R_1R_2O\!:\!BF_3^-\!+\!H^+$. The boron trihalide complex is slowly added to the charge transfer complex, in the weight ratio of charge transfer complex:boron trihalide complex of from about 25 to 200:1 when cycloaliphatic epoxy resins are present in the resin system to be cured, and from about 25 to 40:1 when the resin to be cured is solely a bisphenol A epoxy, at a temperature of up to about 45° C.

Preferably, the combination, charge transfer complex-boron trihalide complex is cold concentrated to provide the dual curing agent of this invention. The charge transfer complex can also be concentrated first and then the boron trihalide complex added. In this latter instance, unless concentration is on the range of only about 80% to 90% there may be a problem of getting the boron trihalide complex to dissolve in the concentrated charge transfer complex.

In all instances, the unreacted carbon containing cyclic compound is evaporated during concentration. Since a minor amount of boron trihalide complex is used, one can talk of concentrating either the charge transfer complex or the mixture of charge transfer complex and boron trihalide complex. Concentration of the charge transfer complex or of the charge transfer complex-boron trihalide complex mixture can be from about 55% to 90%, preferably from about 65% to 80% of its original weight. Concentration below about 60% is very difficult, and not concentrating below about 90% does not yield much benefit in terms of gel and cure times to justify the expense of utilizing a cold concentrating means. Concentrating between 65% and about 80% yields a very workable thick slurry material. Concentration between about 55% and 65% yields a still useful material of increasing solidity as 55% is approached. The term "cold concentration" as used herein is defined as concentration in the temperature range of from about 18° C. to about 30° C. The term "X% concentrated" as used herein is defined as concentrated to X% of its original weight, i.e., 60% concentrated means that 40% of the original weight has been evaporated.

Bisphenol based epoxy resins are useful, especially with the preferred, highly concentrated dual curing agents previously described. These resins may be used as the base resin in the invention, or used in combination with, for example, a cycloaliphatic epoxy. A bisphenol type resin is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction and the product is then washed free of salt and base. The product, instead of being a single simple compound, is generally a complex mixture of glycidyl polyethers, but the principal product may be represented by the chemical structural formula:

where n is an integer of the series, 0, 1, 2, 3 . . . , and R represents the divalent hydrocarbon radical of the dihydric phenol. Typically R is:

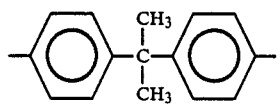

to provide a diglycidyl ether of bisphenol A type epoxy resin or

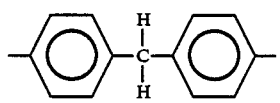

to provide a diglycidyl ether of bisphenol F type epoxy resin.

The bisphenol epoxy resins used in the invention have a 1, 2 epoxy equivalency greater than one. They will generally be diepoxides. By the epoxy equivalency, reference is made to the average number of 1, 2 epoxy groups,

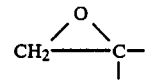

contained in the average molecule of the dlycidylether.

Other epoxy resins that are particularly useful alone or in admixture with bisphenol epoxy resins are epoxy novolacs and cycloalphatic epoxides. The polyglycidylethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

Other epoxy resins useful alone or in mixture with bisphenol types include glycidyl esters, hydantoin epoxy resins, cycloaliphatic epoxy resins and diglycidyl ethers of aliphatic diols. Of these latter four varieties of epoxies, cycloaliphatic epoxies are most useful. The cycloaliphatic type epoxy resins that can be employed as the resin ingredient in the invention are selected from nonglycidyl ether epoxy resins containing more than one 1,2 epoxy group per molecule. These are generally prepared by epoxidizing unsaturated hydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides ketones to give the compound R—COOOH.

Examples of cycloaliphatic epoxy resins would include: 3,4-epoxycyclohexylmethyl-3,4-epoxycyclohexane carboxylate (containing two epoxide groups which are part of ring structures, and an ester linkage); vinyl cyclohexene dioxide (containing two epoxide groups, one of which is part of a ring structure); and 3,4-epoxy-6-methylcyclohexyl methyl-3,4-epoxy-6-methylcyclohexane caboxylate. All of these types of epoxy resins described previously are well known in the art, and reference can be made to U.S. Pat. No. 4,273,914 for additional details in their production. Cycloaliphatic epoxy resins used alone do not require cold concentrating of the dual curing agent admixture of this invention.

Other useful organic resins that can be used in minor amounts with the epoxies and the dual curing agents previously described include vinyl monomers, such as, styrene, 4-methoxy styrene, vinyl toluene, methyl methacrylate, methyl vinyl ketone, or 1,1 diphenyl ethylene and the like, and their mixtures. These resins are well known in the art.

The preferred weight ratio range of epoxy resin: dual curing agent is from about 1:0.2 to 1.5, preferably from about 1:0.4 to 0.60. Use of less than about 0.2 part dual curing agent/1 part organic resin will provide little gel or cure time improvement. Use of over 1.5 parts dual curing agent/1 part organic resin will result in minimal pot life or working time. The range between about 1:0.60 to 1.5 can be especially useful when a filler is used, since filler inclusion often seems to substantially delay gel time.

Natural oil extenders, such as epoxidized linseed or soy bean oils, may also be used in small amounts. Thixotropic agents, such as fumed alumina or fumed silica, having particle sizes of from about 0.005 micron to 0.025 micron, and coloring pigments, such as titanium dioxide, zinc chromate, zinc oxide, zinc sulfide, zirconium oxide, iron oxide, and the like may be used in minor amounts as aids in enhancing the color tones of the cured resins and making paint like compositions.

Similarly, various inorganic particulate fillers, such as alumina trihydrate, silica, quartz, mica, chopped glass fibers, beryllium aluminum silicate, magnesium silicate, lithium aluminum silicate, mixtures thereof, and the like, in average particle sizes of from about 5 microns to about 150 microns, may be employed in amounts up to about 50 parts per 100 parts of resin, to improve electrical properties of the resin formulation, and to lower costs. Photoinitiators are neither required nor desired, since they can provide an impurity element in the composition.

Figure 2:
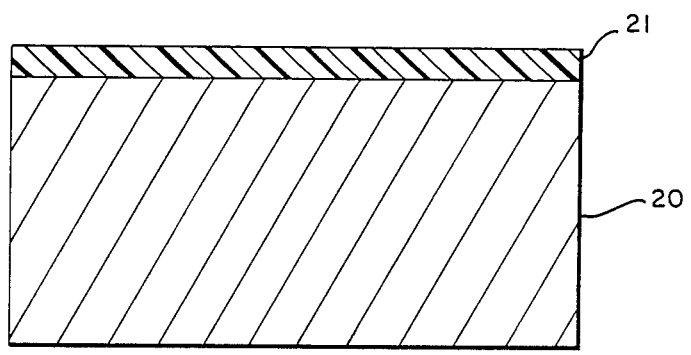
FIG. 2 shows a thin surface coating of the resinous composition of this invention on a metal substrate.

Referring now to FIG. 2 of the Drawings, a metal substrate 20 is coated with a thin coating 21 of the resinous composition of this invention. Substrates can include aluminum, copper and other metals, wood, plastic, and the like. These compositions can be coated in thickness of 0.02 inch or less. Thin films, from about 0.0005 inch to 0.005 inch thick, can be cured in air at from about 25° C. to about 30° C. in about 1 minute to 15 minutes, to provide coatings which are quite flexible and have excellent adhesion and electrical insulating properties. When a cycloaliphatic epoxy resin is used alone, or is a major component with a bisphenol A epoxy resin, a dual mixing spray applicator, having a tank filled with resin and a tank filled with dual curing agent, both of which feed into a mixing nozzle, can be used to coat electrical articles, such as transformers, on an assembly line, where the coating will room temperature cure within about 5 minutes.

EXAMPLE 1

A batch of charge transfer complex solution was first made, containing 50 grams (0.51 mole) of maleic anhydride (MAH) dissolved in 50 milliliters (44.5 grams) of tetrahydrofuran (THF). The MAH and THF were well mixed in a stainless steel beaker with a magnetic stirrer. The beaker was wrapped with copper tubing and the beaker was kept in a bath of ethylene glycol-water mixture. Refrigerated ethylene glycol-water coolant, kept at −20° C. using an Endocol, Neslab refrigeration unit, was circulated through the copper coil wrapped around the beaker and also dipped in the ethylene glycol-water bath. The bath temperature was about 2° C.

During stirring, the mixture was subjected to U.V. irradiation from a 300 watt U.V.-D bulb having a wavelength band between 2,000 Angstrom units and 4,000 Angstrom units, with primary wavelengths between about 3,600 Angstrom units and 3,900 Angstrom units. The cooling arrangement was necessary to dissipate the heat energy generated by the D bulb, so that the mixture components would not evaporate before reaction. In all cases the temperature must be maintained below about 40° C.

After 30 seconds of irradiation, the mixture temperature increased from 18° C. to 35° C., after which the D bulb was shut off and the mixture was allowed to cool down to 18° C. over a 2 minute period. Then the solution was irradiated until a 35° C. temperature was reached, after which it was again cooled to 18° C. This irradiation and cooling cycle was repeated until a total U.V. exposure time of 15 minutes was obtained. During the 15 minutes irradiation, the colorless MAH-THF solution had turned to red, indicating some interaction between the MAH and the THF. The development of color was followed spectrophotometrically. In the MAH-THF mixture, charge transfer complexes, having an absorption maxima at about 4,480 Angstrom units were formed. The irradiated, highly fluid solution of MAH-THF, the charge transfer complex, was found to contain a substantial amount of unreacted tetrahydrofuran, the carbon containing cyclic compound, from about 20% to about 50% of the THF added.

To 5 grams of this unconcentrated charge transfer complex, 0.15 gram of boron trifluoride:amine complex was added, providing a weight ratio of charge transfer complex:boron trifluoride complex of 33:1. The boron trifluoride:amine complex easily dissolved in the charge transfer solution. The mixture was then placed in a small vacuum chamber apparatus, i.e., a vacuum dessicator attached to a vacuum line drawing 0.5 Torr to 1.0 Torr., until its weight was reduced to 85% of its original weight. This concentration was carried out at 25° C., and produced a concentrated, dual curing agent solution having substantially all of the unreacted THF removed without decomposing the already formed charge transfer complex or affecting the boron trifluoride. The concentrated charge transfer complex was still in liquid form.

This concentrated mixture of charge transfer complex and boron trifluoride:amine was then used to cure thin coatings of an all bisphenol A epoxy resin system on 3"×6"×0.1" steel strips, as shown below in Table 1:

TABLE 1

| Resin | Wt. Ratio Resin:Dual Curing Agent | Pot Life 25° C. Minutes | Coating Thickness Inch | Complete Cure Time 25° C. Minutes | Bend ¼" Mandrel | X-Hatch Adhesion Test |
|---|---|---|---|---|---|---|
| bisphenol A epoxy* | 2:1 | 5 | 0.001 | 10 | Pass | Pass |
| bisphenol A epoxy* | 2:1 | 5 | 0.002 | 10 | Pass | 90% |

*liquid diglycidyl ether of bisphenol A having an epoxy equivalent weight of 180–188 and a viscosity at 25° C. of 6500–9000 cps (sold commercially by Shell Chemical Company under the tradename Epon 826).

As can be seen, flexible, thin coatings having good adherence resulted, with very fast cure times at 25° C. for an all bisphenol A system. A similar, 0.0015 inch thick coating of Epon 826 bisphenol A epoxy, with a wt. ratio of resin:concentrated MAH-THF charge transfer complex of 2:1, but without any boron trifluoride amine, took 7 days to completely cure at 25° C.

Cure times as low as 1 to 4 minutes at 25° C. for 0.0015 inch thickness were achieved when a cycloaliphatic epoxy resin was used alone with the boron trifluoride containing dual curing agent described in this Example, where a resin:dual curing agent ratio of 2:1 was used; compared to about 24 hours at 25° C. when the boron trihalide was omitted from the curing agent. As can be seen, the combination of boron trihalide and MAH-THF charge transfer complex provides a dramatic difference in curing epoxy resins, especially bisphenol A types.

We claim:

1. An insulated article where the insulation is a cured thin coating comprising:

I an epoxy resin, and

II a dual curing agent admixture consisting essentially of:

(A) the irradiated mixture of:

(i) a carboxylic acid anhydride having the chemical formula:

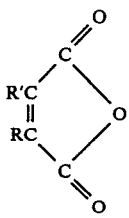

where R and R'=H, CH$_3$, C$_2$H$_5$, Cl, Br or I;

(ii) a carbon containing cyclic compound containing an electron deficient element selected from the group consisting of sulfur, oxygen, and mixtures thereof, and (B) a boron trihalide complex, selected from the group consisting of boron trihalide:amine complex, boron trihalide:ether complex, and mixtures thereof; where the irradiated mixture of (A) is concentrated either before or after mixing with the boron trihalide complex of (B), prior to admixing with epoxy resin, the surface of the article is a material selected from the group consisting of metal, wood and plastic, the coating has a thickness of less than about 0.02 inch, and the coating has a fast, room temperature cure.

2. The insulated article of claim 1, where the epoxy resin contains bisphenol A epoxy, the carboxylic acid anhydride is selected from the group consisting of citraconic anhydride and maleic anhydride, the carbon containing cyclic compound is selected from the group consisting of dioxane, tetrahydrofuran, and mixtures thereof, the boron trihalide complex is selected from the group consisting of boron trifluoride:amine, boron trichloride:amine, and mixtures thereof, and the dual curing agent is irradiated with radiation that contains radiation within the wavelength range of from about 130 Angstrom units to about 7,000 Angstrom units, where the concentration step is effective to reduce the weight to from about 55% to about 90% of the original weight, and where the coating is up to about 0.005 inch thick and is room temperature curable at about 30° C. within about 15 minutes.

3. The insulated article of claim 1 where the coating is a paint and also contains coloring pigment.

4. The insulated article of claim 1, where the weight ratio of the irradiated mixture of carboxylic acid anhydride and carbon containing cyclic compound:boron trihalide complex is from about 25 to 200:1 and the weight ratio of epoxy resin:curing agent admixture is from about 1:0.2 to 1.5.

5. The insulated article of claim 1, where the epoxy resin is a bisphenol A epoxy resin, the weight ratio of the irradiated mixture of carboxylic acid anhydride and carbon containing cyclic compound:boron trihalide complex is from about 25 to 40:1 and the weight ratio of epoxy resin:curing agent admixture is from about 1:0.2 to 1.5.

6. The insulated article of claim 1, where the epoxy resin is selected from the group consisting of cycloaliphatic epoxy resin, bisphenol A epoxy resin, and mixtures thereof.

7. The insulated article of claim 1, where the coating also contains inorganic filler particles.

8. The insulated article of claim 1, being a transformer component.

* * * * *